United States Patent [19]

Alvarez-Sabater

[11] 4,291,955

[45] Sep. 29, 1981

[54] GRAVITY-FEED ROTARY TRAY SLIDE PROJECTOR

[76] Inventor: Fernando Alvarez-Sabater, P.O. Box 3628, Caracas 101A, Caracas, Venezuela

[21] Appl. No.: 163,350

[22] Filed: Jun. 26, 1980

Related U.S. Application Data

[63] Continuation-in-part of Ser. No. 52,952, Jun. 27, 1979, Pat. No. 4,232,953.

[51] Int. Cl.³ .................. G09F 11/30; G03B 23/02
[52] U.S. Cl. .................................. 353/111; 40/511
[58] Field of Search ............... 353/111, 112, 113, 107; 40/511, 473, 476

[56] References Cited

U.S. PATENT DOCUMENTS

| | | | |
|---|---|---|---|
| 1,412,885 | 10/1928 | Mottet | 40/501 |
| 2,748,653 | 1/1956 | Pollan et al. | 353/107 |
| 2,856,812 | 10/1958 | Barron | 353/111 |
| 3,343,454 | 9/1967 | Mahoney | 353/21 |
| 3,402,489 | 9/1968 | Schlessel | 206/316 |
| 3,411,227 | 11/1968 | Sobotta | 353/111 |
| 3,469,910 | 9/1930 | Badalich | 353/117 |
| 3,680,953 | 8/1972 | Rube | 353/117 |
| 3,874,788 | 4/1975 | Thorn et a. | 353/111 |
| 4,105,317 | 8/1978 | Sobotta | 353/117 |
| 4,232,953 | 11/1980 | Sabater | 353/111 |

FOREIGN PATENT DOCUMENTS

| | | | |
|---|---|---|---|
| 163142 | 5/1949 | Austria | 353/111 |
| 2306153 | of 0000 | Fed. Rep. of Germany | |

Primary Examiner—Steven L. Stephan
Attorney, Agent, or Firm—Fleit & Jacobson

[57] ABSTRACT

A slide projector for projecting slides transferred into and out of registry with a projection aperture solely by the force of gravity. A rotary slide tray is vertically arranged with the slides in a radial orientation, and the rotary slide tray is arranged over a central hub portion having a vertically arranged projection passage formed therein. Upon rotating the rotary slide tray, slides are permitted to radially drop from the tray by the influence of gravity into the projection passage and will be caused to back-up in the passage, since they are falling entirely through the slot and resting upon slides already in the rotary slide tray in diametrically opposed locations. A specialized slide construction, formed as a double planar slide of two individual slides arranged having like horizontal edges arranged adjacent or a single slide with a recess formed in one horizontal edge is employed. A shutter controlled by a solenoid actuated by insertion of a properly oriented slide into a recess in a tray is provided to block the projection passage except when a properly oriented slide is aligned with the projection aperture. A modification of the projector utilizes an arcuate shaped slide path to guide slides from the lower end of a vertical slide passageway to an upper end of the passageway, the slides being projected during passage through the slide passageway. A pusher pushes slides from the passageway into the slide path in such manner that all of the slides are advanced through the slide path.

3 Claims, 17 Drawing Figures

GRAVITY-FEED ROTARY TRAY SLIDE PROJECTOR

CROSS REFERENCE TO RELATED APPLICATION

This application is a continuation-in-part of U.S. Patent Application Ser. No. 052,952, filed June 27, 1979 now U.S. Pat. No. 4,232,953, the contents of which are incorporated herein by reference.

BACKGROUND OF THE INVENTION

1. Field of the Invention

The present invention relates to slide projectors and, in particular, to slide projectors having a rotary tray for retaining slides during the projection operation. The invention also provides a projector using a fixed, semi-circular tray to hold slides.

2. Description of the Prior Art

Following the invention of the positive transparency, there have been a multitude of various systems proposed to view the image on the positive transparency. Positive transparencies are known more popularly as slides. In fact, at present, slides are among the most popular forms of amateur photography. Along with this popularity, there are numerous systems commercially available to project the image of the positive transparency onto a screen, or the like, for viewing.

While certain of the presently available slide projectors employ the force of gravity to perform a portion of the slide transfer operation, none of these slide projectors can transfer a slide form a slide magazine to a projection lens and back to the magazine using only the forces of gravity. Moreover, in any mechanical system requiring an electrically-driven linkage to move elements, which are as small as a photographic slide, and having loose mechanical manufacturing tolerances, binding of the linkage and/or the slide is almost certain to occur. In fact, this is a significant problem in many slide projectors, i.e., that the slides tend to hang up in the magazine or in the changing mechanism, and jamming is a frequent occurrence.

BRIEF SUMMARY OF THE INVENTION

The present invention provides a slide projector having a rotary slide tray, which feeds a slide to a projection optics system totally by the force of gravity, and then transfers the slide from the projection optics system back to the magazine, also totally by the force of gravity. A rotary slide tray or magazine is provided in a vertical orientation relative to the projector and cooperates with a central hub-like portion of the projector. The central hub portion is provided with a slide passage or projection passage and is located at the center of the rotary slide tray. The slides are loaded into the magazine only in a selected portion of the available slots and, as the magazine rotates, a slide falls from the magazine by the force of gravity into the slide passage. A projection aperture, located in the projection passage, is aligned with the slide and the projection optic system projects the image on the slide. When the rotary slide tray advances one position, an empty slot in the tray should be aligned with the exit of the projection passage and the slide therein will drop, by the force of gravity, into the empty slot.

Subsequently, or preferably simultaneously with this occurrence, a slot in the rotary slide tray containing a slide will be aligned with the entrance of the projection passage, and the slide will fall, by the force of gravity, into the projection passage. A slide already in the projection passage will be aligned with the projection aperture, provided that either it or a preceding slide is resting on, and supported by, a slide already contained in a slot in the rotary slide tray at the exit of the projection passage.

Thus, it may be seen that by choosing the dimensions of the projection passage judiciously, that any diameter of rotary slide tray is possible, thereby greatly increasing the slide-storing capacity of the tray. The length of the projection passage from the projection aperture to the top of a slide in a slot in a rotary slide tray need only be a multiple of the slide height, and any diameter of slide tray is feasible.

The instant invention advantageously employs a projection optics system, which is located at the center of the slide magazine. In such embodiment, the lamp and condensor lens are located on one side of the projection passage and aligned with the projection aperture, and the objective lens is located on the other side of the projection slot.

Therefore, the present invention provides a slide projector which feeds slides to a projection optics system totally by the force of gravity, and which also transfers each slide from the projection optics back to the slide magazine, also totally by the force of gravity.

The present invention also provides a gravity-feed rotary tray slide projector, wherein the projection optics are arranged at the center of the rotary slide tray.

The present invention further provides a gravity-feed rotary tray slide projector, which employs specialized double-set slides, placed in the tray in a specific arrangement, which doubles the capacity of the slide tray.

Still further, the present invention provides a shutter for blocking the projection aperture, the shutter being movable to uncover the projection aperture only when a slide is properly positioned in alignment with the aperture. Advantageously, opening and closing of the shutter is controlled by a switch positioned in a portion of the housing in alignment with the projection passage and extending into a slot of the tray positioned to receive a slide from the exit end of the slide passage. The switch is closed when a properly oriented slide enters the slot in the slide tray from the exit end of the slide or projection passage. Spacers between adjacent slots formed in the slide tray have recessed portions so that the switch is not closed by the spacers during rotation of the slide tray.

In one embodiment of the present invention, single slides are used having recessed portions in one horizontal edge. Slides are inserted into the slide tray in alternating up and down orientation, with the orientation of each slide being changed by passage of the slides through the slide passage. Arrangement of the slides in the slide tray is such that when a properly oriented slide is positioned in alignment with the projection aperture, a correspondingly oriented slide will be entering a slot in the slide tray arranged in alignment with the exit end of the slide passage, with the recessed edge of the slide facing radially inwardly so that the outer edge closes the switch to move the shutter into an aperture unblocking position. When double slides are used with the invention, there is no need to provide such recesses.

The invention also provides a slide holder for a single slide having a recessed portion formed in one horizontal edge so that conventional slides can be used with the inventive slide projector by simply inserting the slides into the slide holder. A double slide holder is provided for the same purpose.

Still further, the present invention provides a slide projector intended for continuous operation in which an arcuate shaped slide path is defined by half of an annular slide tray positioned within a housing, or by spaced apart inner and outer arcuate walls positioned within the housing. The slide path has an entrance end positioned in a lower portion of the housing and an exit end positioned substantially vertically above the entrance end. A substantially vertically extending slide passage is defined within the housing to interconnect the exit and entrance ends of the slide path. A projection aperture is formed in the slide passage for projection of slides. A manually operated or power operated pusher is provided to push a slide from a bottom portion of the slide passage into the entrance of the slide path. The slides and slide path are designed in such manner that pushing of a slide into the entrance end of a path full of slides results in advancing all of the slides through the slide path and pushing of the leading slide in the path out of the exit end and into the slide passage.

The manner in which objects of the present invention are accomplished will become clear from the following detailed description of preferred embodiments.

BRIEF DESCRIPTION OF THE DRAWINGS

In the detailed description of the preferred embodiments of the invention hereinafter presented, reference is made to the accompanying drawings, in which.

DETAILED DESCRIPTION OF THE PREFERRED EMBODIMENTS

Because slide projectors and slide trays are well-known, the present description will be directed in particular to elements forming part of, or cooperating more directly with, the present invention. Elements not specifically shown or described herein are understood to be selectable from those known in the art.

Figure 1:
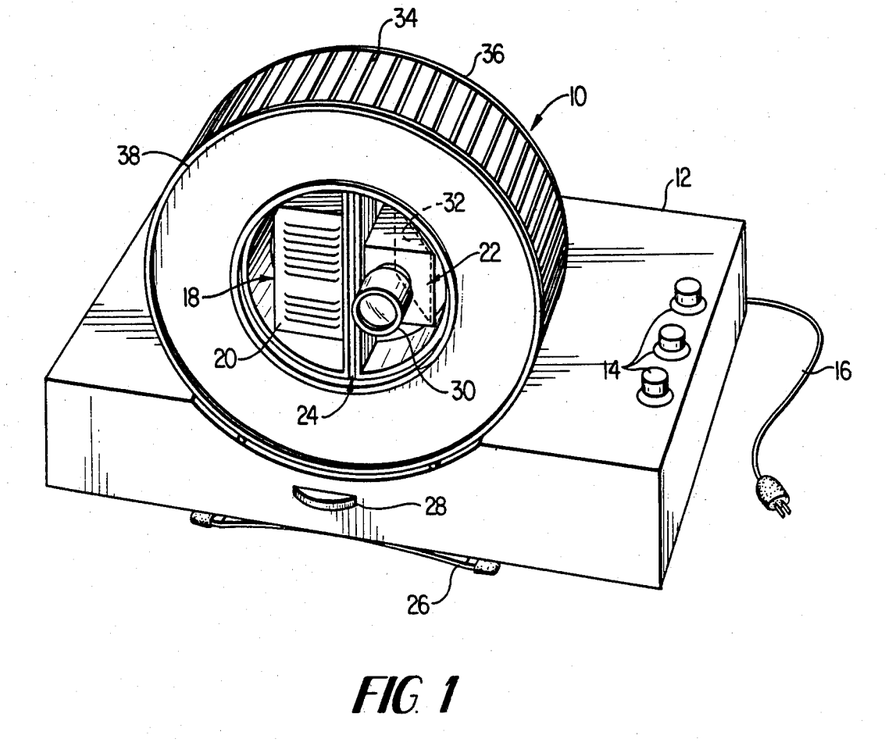
FIG. 1 is a perspective of one embodiment of the inventive slide projector.

Referring now to the drawings, FIG. 1 is a perspective of one embodiment of the inventive gravity-feed rotary-tray slide projector, wherein a rotary slide tray 10 is arranged in a vertical orientation, relative to a main projector housing 12, which is normally intended to be placed upon a horizontal table surface or the like. The inventive slide projector is provided with controls of the conventional type, shown typically at 14, and is intended to be powered by ordinary household current, to which it is connected by a power cord 16. The rotary slide tray 10 is arranged around a central hub portion 18, which has a projection lamp housing 20, as well as projection optics 22, mounted therein. The central hub portion defines a projection passage 24 into which slides are fed for projection. The projector is provided with a means to change the angle of the optical axis of the lens relative to the horizontal. Such means may comprise a foot arrangement 26, which is attached by a threaded rod to an adjustment knob 28, whereby upon rotating the adjustment knob 28, the foot 26 may be raised or lowered. In this manner, the projection angle of the lens system 22 relative to the horizontal is changed and the projector is aimed toward the screen at a different angle in relation to the horizontal. A portion of the housing 12 of the projector is relieved, so that the rotary slide tray 10 fits down into the housing 12. This serves to reduce the overall height of the inventive projector. As will be discussed hereinafter, this relieved portion contains means to aid in supporting the rotary slide tray and also serves to provide an access to a drive mechanism for rotating the tray.

The projection lens system 22 is located central to the rotary slide tray and includes a conventional objective lens 30, which may be manually focused, and a mirror 32, which serves to direct the image through the objective lens 30. The projection screen or surface must be located in front of the objective lens 30 and preferably parallel to the rotary slide tray. The slides are arranged in slots in the tray, shown typically at 34, and may be retained therein by rings 36 and 38, either or both of which may be removable to place the slides in the tray.

As will be further described in more detail later, the rotary slide tray is caused to rotate, and when each slide reaches the projection passage 24, it will fall in an inwardly radial direction down into the projection passage 24. The slides are originally arranged in the slide tray 10 so that when the first slide passes through the slide passage 24, it will abut a slide already in a slot in the slide tray at the bottom of the passage 24. The slides will then be backed-up in the slot 24, until one is aligned with the projection aperture. Upon continuing the rotation of the rotary slide tray, each slide will fall by the force of gravity from the exit of the projection slot 24 and enter an empty slot in the rotary slide tray 10.

Figure 2:
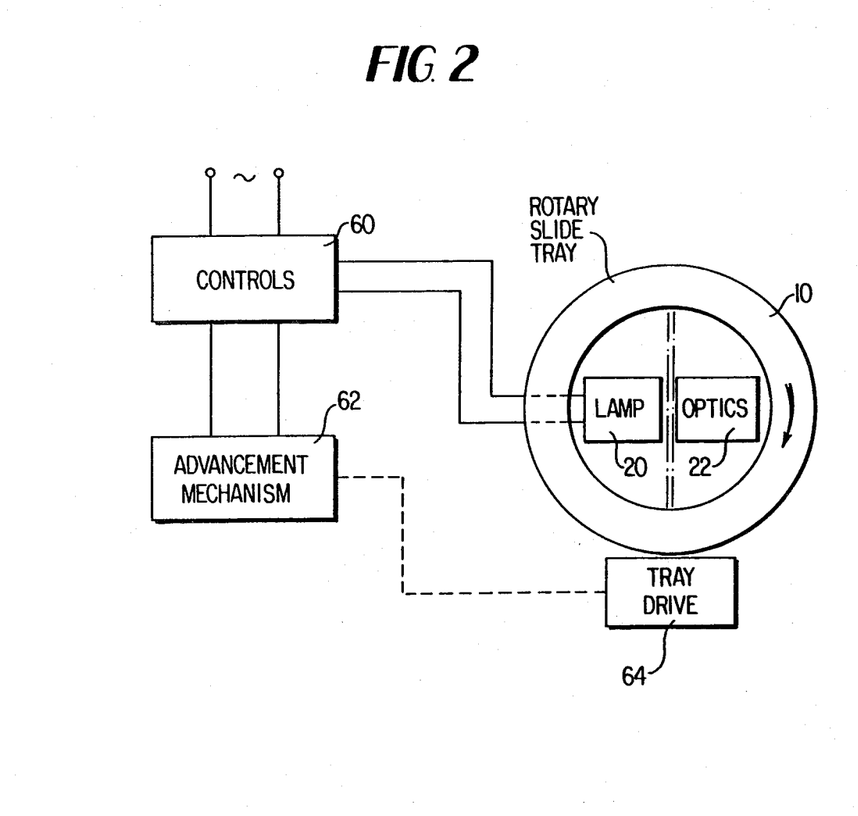
FIG. 2 is a schematic diagram of the inventive slide projector of FIG. 1.

FIG. 2 is a schematic representation showing the principle components of the inventive slide projector system and the manner in which they are mechanically and electrically driven. The controls, which are labelled 14 in FIG. 1, are shown as a block 60 and can comprise an on-off switch, a sequence or advance switch, and a fan switch, i.e., controls which are normally found in all slide projectors. The controls 60 also serve to control the energization of rotating or advancement mechanism 62, such as a solenoid or a stepping motor, which is mechanically connected by a shaft or linkage to a tray drive 64, which is in contact with the rotary slide tray 10 and serves to advance the tray or back it up, depending upon the specific actuation of the controls 60. The controls 60 may also serve to energize the lamp 20, which is located central to the rotary slide tray 10. The solenoid 62 may be of simple design and in the embodiment of FIG. 2, a rotary solenoid and a drive gear are all that is required to advance the rotary slide tray 10. Other embodiments are equally feasible, for example, the plunger of a linear solenoid may be used in combination with a pawl and ratchet to advance the rotary slide tray 10.

Figure 3:
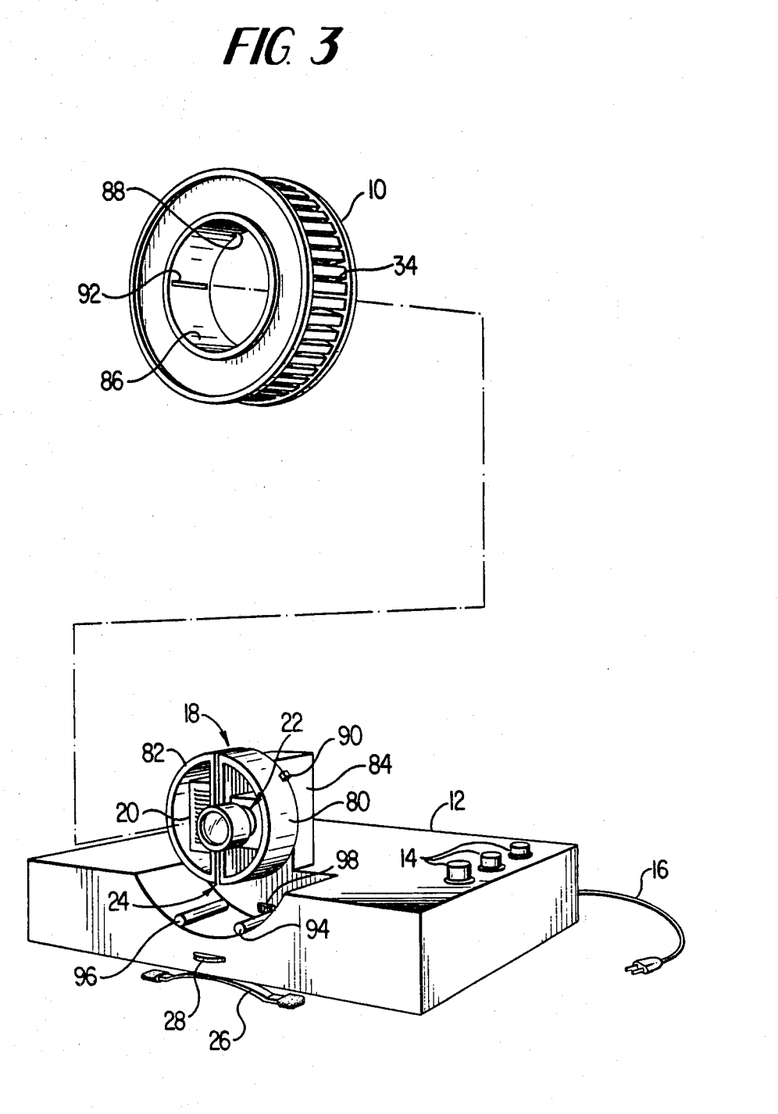
FIG. 3 is an exploded perspective of the inventive slide projector of FIG. 1.

FIG. 3 shows an embodiment of the inventive rotary slide projection system having the rotary slide tray 10 removed from the projector mechanism. The tray 10 fits over the cylindrical central hub structure 18, which is formed having two semi-circular portions, 80 and 82. These semicircular portions, 80 and 82, define therebetween the slide passageway or projection passage 24. The central hub assembly 18 is supported by an upstanding structural member 84, which is affixed to the slide projector housing 12. The structural member 84 can contain the necessary wiring and the like to control the lamp assembly 20. This structural member 84 can be easily made to be as tall as necessary in order to accommodate any diameter of rotary slide tray.

The rotary slide tray 10 is formed with slots 34 to accept the slides, and the inner surface of the tray has a metal sleeve 86 to retain the slides in the tray. The metal sleeve 86 can rotate relative to the slide tray 10. The sleeve 86 has a notch or keyway 88 which cooperates with an indexing key 90 located on the central hub 18. The metal sleeve 86 is formed having two slots, one of which is seen at 92. The two slots are of a size to permit a slide to fit through edgewise and are located mutually diametrically opposed in the metal sleeve 86. In operation, the slide tray 10 is arranged over the center hub 18 and the key 90 indexes the keyway 88, thereby aligning slots 92 with the top and bottom openings, i.e., the entrance and exit, of slide passage 24. As the slide tray 10 is rotated, successive slides come into registry with the slots 92 and are permitted to enter and exit the slide passage 24.

In the embodiment shown in FIG. 3, the rotary slide tray 10 rests on two idler rollers 94 and 96, which serve to support some of the weight of the loaded slide tray 10. The tray 10 is also supported, in part, by the central hub assembly 18. In this embodiment, rotary motion is imparted to the slide tray 10 by a spur gear 98, which corresponds to the tray drive 64 of FIG. 2. The spur gear 64 mates with gear teeth formed on the flat disclike surface at the back of the slide tray 10. These gear teeth are not shown in FIG. 3. As seen in FIG. 2, it is the solenoid or stepping motor which drives the spur gear 98 in the desired direction.

As indicated above, the present invention operates to transport slides from the rotary slide tray for projection and back to the rotary slide tray following projection, solely by means of gravity. There is no requirement for any additional mechanical drives to transfer the slides into or out of the appropriate projection slots in the slide tray.

Figure 4:
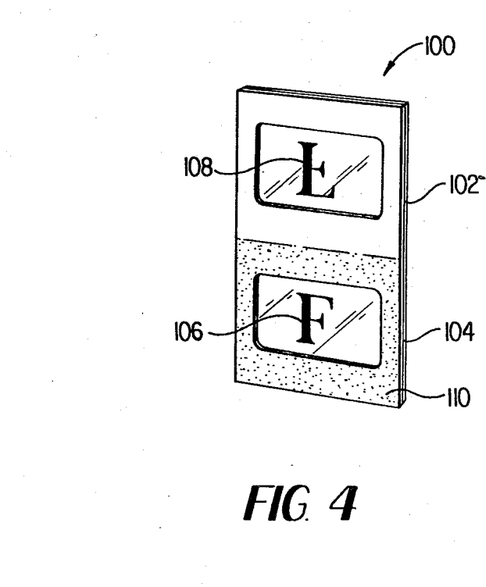
FIG. 4 is a perspective of one embodiment of an inventive double slide for use in the inventive projector of FIG. 1.
Figure 5:
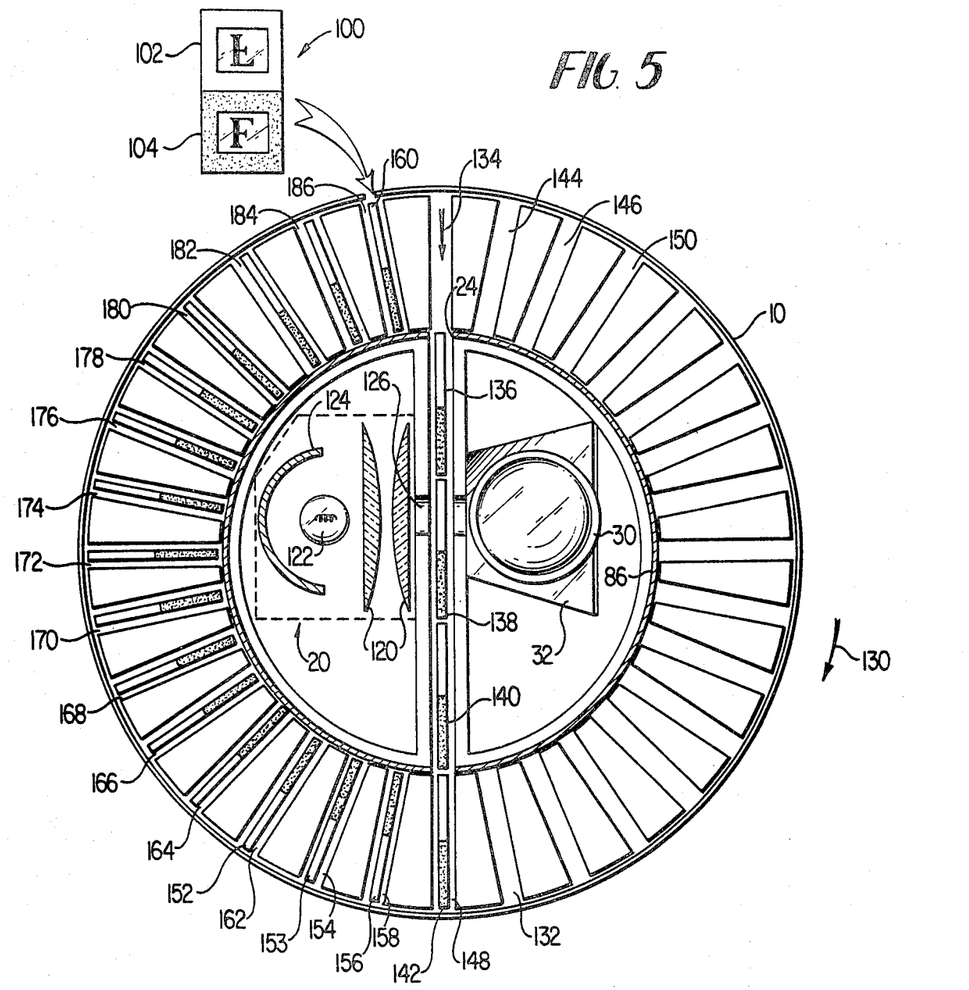
FIG. 5 is a side elevation view, partially schematic, of one embodiment of the inventive rotary slide tray used with the inventive projector of FIG. 1.

In the embodiment shown in FIG. 5, the present invention further teaches that the slides may be specially constructed so as to double the effective slide-holding capacity of the inventive rotary slide tray. The inventive slide is shown in FIG. 4 at 100 and consists of two individual slides 102 and 104, arranged in a head-to-head orientation, so as to form a rectangular planar double slide. The head-to-head orientation is not critical and the slides may be arranged bottom-to-bottom. In any event, as will be seen in the description of FIGS. 5 and 6, each combination slide 100 will be caused to enter into the projection slot of the inventive slide projector twice, in order to project all the slide images contained in the tray. Hence, the slide 100 will be "upside down" the second time it is projected. Similarly, in order to provide the correct left to right orientation of the scene, and also to project the light through the slide from the base side of the film, the slides 102 and 104 are reversed in a front-to-back orientation relative to each other. This results in the slides 102 and 104 also being in a reversed left-to-right orientation. In other words, in FIG. 4, the letter F, which is designated 106 on slide 104, is in the correct left-to-right orientation, i.e., the emulsion side of the film is facing out in FIG. 2. In the slide 102, the letter F, which is designated 108 on that slide, is in the reversed orientation, with the base side of the film facing the reader. The stippling 110 on slide 104 is presented only by way of a reference to show the orientation of a slide and is not present on a commercial embodiment. In the present example, the stippling 110 corresponds to the emulsion side of the film. It should be understood that the present invention can be practiced without the requirement for the specialized slide construction, and a single slide will function correctly, provided that an optical image inverter is employed or other suitable system, such as the system of FIGS. 9a, 9b, and 10.

Referring to FIG. 5, the lamp assembly 20 has a condensor lens pair 120 and a projection lamp 122, having a curved reflector 124, which directs the light from lamp 122 onto the condensor lens pair 120. The light is then directed through a projection aperture 126 located in both sides of the projection passage 24. The light from lamp 122 passes through the slide, if one is in the projection passage. The image is then incident upon mirror 32, which is arranged at a 45 degree angle, to direct the image through the objective lens system 30 to a projection screen (not shown), which should be arranged parallel to the rotary slide tray 10.

As seen in FIG. 5, the inside of rotary slide tray 10 is formed into a plurality of slots, which are of depth to accept the double slides 100, and have separators, which define the slots. The rotary slide tray 10 is intended to move in a clockwise direction, as indicated by arrow 130. As each slide comes in register with the slot 92 in the metal sleeve 86 and the projection passage 24, it will be caused to fall down into the passage 24. The slides are loaded into the tray 10 in such a manner as to provide empty slots at selected locations in the rotary slide tray, for example, the slot shown at 132 is to be left open. As the tray 10 rotates in the clockwise manner, as shown by arrow 130, successive slides will be brought into registry with the slide passage 24. As shown in FIG. 5, slide slot 134 is presently aligned with the entrance to slide passage 24, and slide 136, which was previously contained in slide slot 134, has entered the projection passage 24. This slide 136 then rests on a slide 138 already in the projection passage 24 and which was previously contained in slide slot 144. Slide 138 is resting upon another slide 140, which entered the slide passage 24 in advance of these two slides and was originally in slide slot 146. Slide 140 rests upon slide 142, which is now contained in slot 148 of the slide tray 10, and which had previously been retained in slide slot 150. Slide 142 was not originally in slide slot 148; however, and this may be easily seen, since slide 142 has the stippled portion, which was represented as slide portion 104 of the exemplary slide 100, pointing radially outwards, whereas the stippled portions of the remaining slides are all pointing radially inwards.

Figure 6:
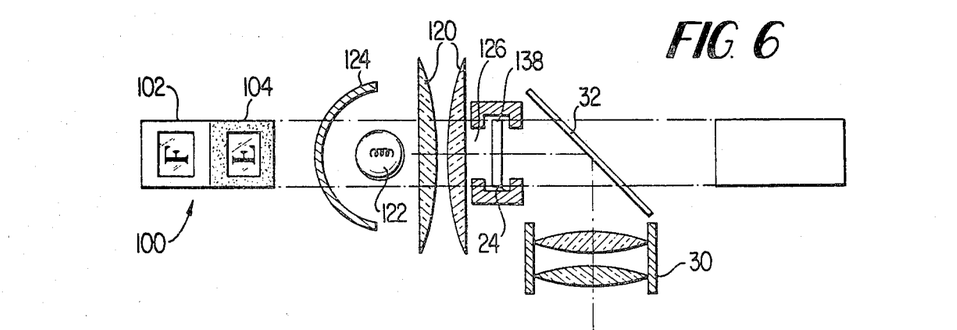
FIG. 6 is a schematic diagram of one embodiment of an optical system used with the inventive slide projector of FIG. 1.

FIG. 6 shows the projection portion of the inventive slide projector in a diagrammatic view and, as may be seen, the light from lamp 122 is directed by the condensor lens pair 120 through the projection slot 126 which is formed in the projection passage 24, and through the appropriate portion of slide 138. The image is then directed towards mirror 30 and is reflected through a right angle to the objective lens 32 and thence to a screen. It is not critical that the necessary mirror 30 be used, and a prism or the like could be substituted.

In operation, the inventive slide projector previously described functions as follows. The slides are arranged in the empty slots 34 in the slide tray 10 and, in the embodiment illustrated in FIG. 5, slides are placed in the slots labelled 134, 144, 146, 150, 154, 158 and 162-186. The remaining slots are then left empty. The tray is placed on the central hub 18 and the notch 88 in the sleeve 86 is indexed with the key 90. The loaded tray 10 is arranged on the central hub 18 so that the first slot having a slide contained therein is only one step in a counter-clockwise direction from being in registry with the entrance of the projection passage 24. Upon energization of the solenoid 60, the slide tray 10 is advanced one slot and the slide resident in the appropriate slot will fall, solely by the force of gravity, down through the projection passage 24, and will rest upon a slide already contained in a slot in the slide tray.

In the embodiment of FIG. 5, slide 142 originally entered the projection passage 24 first and fell down the passage until it rested on slide 152, which is contained in slot 164. Upon the next step in the clockwise rotation of the tray 10, slide 140 which was contained in slot 146, was brought into registry with sliding passageway 24 and fell under the force of gravity into the projection passage 24. Slide 140 at that time was resting on slide 153 contained in slot 154.

Slide 138 is formed corresponding to the general example of slide 100, shown in FIG. 4, and, hence, the non-stippled portion of slide 138, corresponding to slide 102, is in registry with the projection aperture 126. Therefore, provided that the lamp 122 is functioning properly, light will be directed through the slide 102 and the image of letter 108 will be projected in the proper orientation. After slide 136 has entered the projection passage 24, with the next rotation of the slide tray 10, slot 132 will be brought into registry with the exit of the projection passage 24 and slide 140 will fall, solely by the force of gravity, into slot 132, thereby permitting the next successive slot 186 to be in registry with the entrance of the projection passage 24. As may be seen from FIG. 5, only one slide, i.e., slide 142, will not have had one of its two slides projected in the initial sequence of 360 degree revolution of the slide tray.

It may be seen from FIGS. 4 and 5, and particularly from the stippled portions of the combination slides, that once a slide has passed through the projection passage 24, it then becomes reversed in relation to its previous orientation towards the center of the slide tray. In other words, slide 142 has the portion corresponding to slide 104 facing radially outwards, while all other slides still in their slots have the portion corresponding to slide 104 facing radially inwards. This has the effect that after the slide tray 10 has been rotated a sufficient number of steps to bring slide 142 in slot 148 into registry with the entrance of the projection passage 24, such that it may fall downwardly, that it will then fall with the portion of the slide corresponding to slide 102 in an inwardly facing manner. Thus, the portion corresponding to slide 104 will be ultimately brought into alignment with the projection aperture 126. This has the effect that after two cycles of the tray, both of the elements which make up the combination slide, will be projected onto the screen.

As indicated above, since slide 142 fell through the passage in the initial start-up, without having any portion projected, the projection operation should continue one last step, so that the portion of this slide corresponding to slide 102, will be viewed as the very last slide in the projection series.

Referring now to FIGS. 7 to 19, modifications and additional embodiments of the present invention will be described. Since the structure illustrated in these figures is similar to the structure previously described in connection with FIGS. 1 to 6, the same reference numerals will be used to identify elements similar to those previously described.

Figure 7:
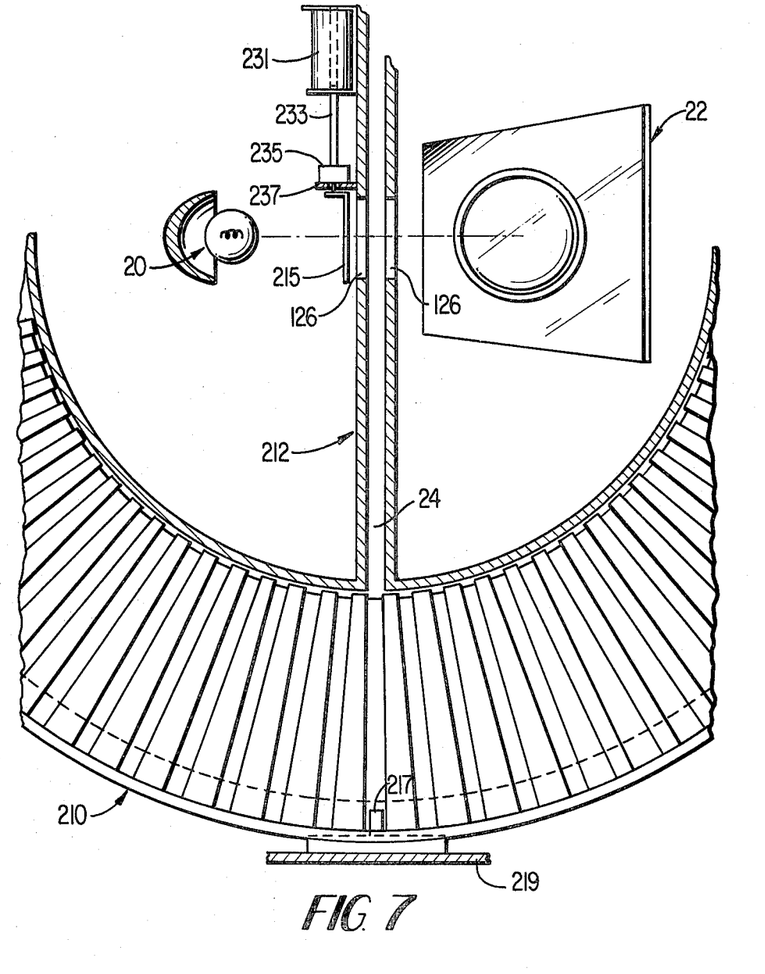
FIG. 7 is a schematic partial side view of another embodiment of an inventive slide projector and rotary slide tray according to the present invention.
Figure 8:
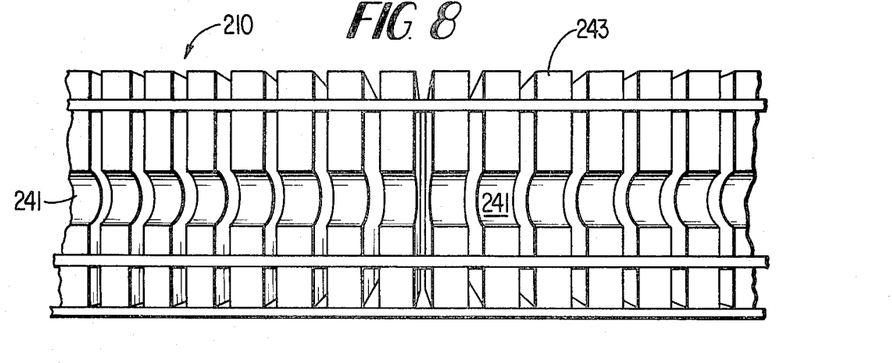
FIG. 8 is a partial end view of the rotary slide tray of FIG. 7.

Referring now to FIGS. 7 and 8, an embodiment of the invention is illustrated having a shutter for controlling light transmission through the projection apertures 126 formed in the slide passageway 24. In FIGS. 7 and 8, a rotary slide tray, a portion of which designated 210 is illustrated, is arranged in a vertical orientation relative to a main projector housing, a portion of which designated 212 is illustrated. The interaction between the slide tray 210 and the slide projector 212 is basically the same as the interaction between the previously described tray 10 and projector 12. Accordingly, a detailed description of all of the components and functioning of the structure illustrated in FIGS. 7 and 8 is considered redundant. There, however, is a major difference between the embodiment illustrated in FIGS. 7 and 8 and that illustrated in FIGS. 1 to 6. Specifically, the embodiment of FIGS. 7 and 8 has a shutter 215 that is movable between a position blocking the projection apertures 126 and an aperture unblocking position. Control of the shutter 215 is such that the aperture is unblocked only when a slide is properly oriented for viewing.

Referring now to FIGS. 7, 9a, 9b, and 10, a suitable control system for controlling movement of the shutter 215 will be described. The control system includes a switch element 217 that is connected to a sidewall 219 of the projector housing 212. The switch 217 has a sensing element 221 in alignment with and extending towards the slide passageway 24. A spring 223 biases the sensing element 221 into a position opening the switch 217. Connecting wires 225, 227, and 229 connect the switch element to a power source (not shown) and to a solenoid 231. When switch 217 is closed, solenoid 231 is energized by the power source and draws a plunger 233 connected to the shutter 215 upwardly into the center of the solenoid, thereby moving the shutter 215 into an aperture unblocking position. When the switch 217 is again opened, the solenoid 231 is deenergized and the shutter is moved, by gravity, into its aperture blocking position. To facilitate such movement, a weight 235, which is also attracted by the energized solenoid, is connected to the plunger 233. Preferably, a stop is positioned out of the path of movement of shutter 215 to limit downward movement of shutter 215, for instance, a stop 237 is illustrated connected to a wall of slide passageway 27.

Figure 9A:
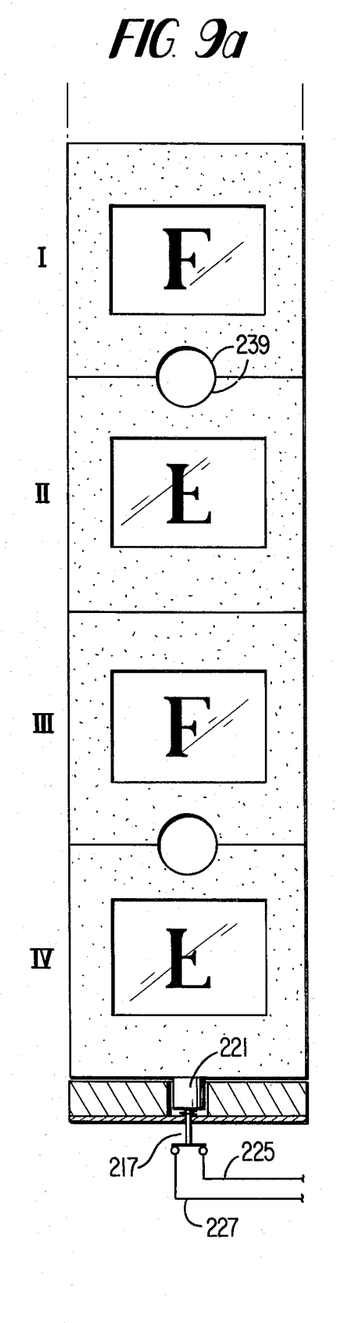
FIGS. 9a and 9b are schematic representations of a slide projector of the type illustrated in FIG. 7 used to project single slides.
Figure 9B:
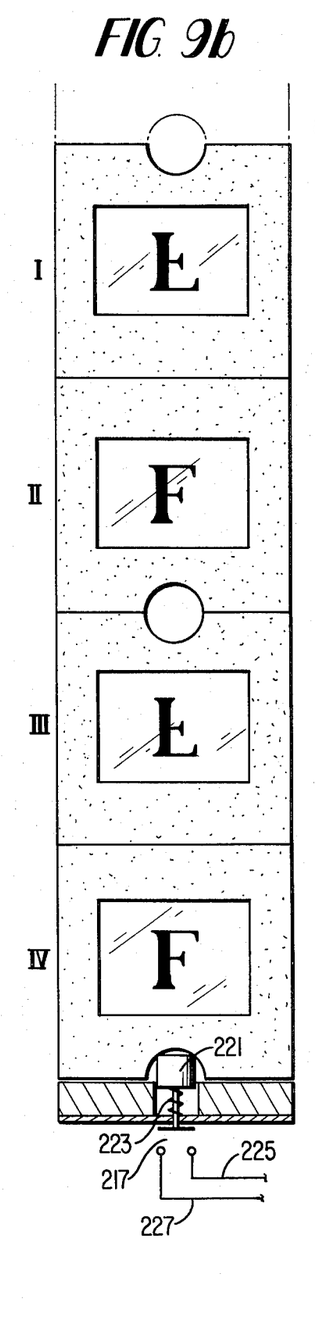
Figure 10:
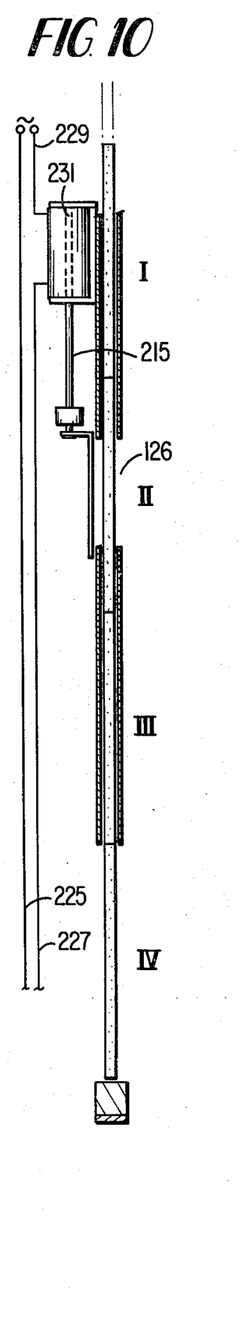
FIG. 10 is a schematic view of the projection passageway of the slide projector used with FIGS. 9a and 9b.

Referring now to FIGS. 9a, 9b, and 10, use of the shutter control system with single slides will be described. When single slides are used, it is necessary to form recesses 239 in like horizontal edges, for instance lower edges, of the slides. Also, the slides are arranged in the slide tray 210 in alternating arrangement, that is, one slide is positioned with its recess facing radially inwardly and the next adjacent slide is positioned with its recess facing radially outwardly. Thus, slides entering the passageway 24 will have an alternating vertical orientation, for instance, slides in positions I and III have their lower horizontal edges down, while slides in positions II and IV have their lower horizontal edges up. The projection system used in the projector 212 is such that a slide must have its upper edge down in order to be properly projected. Accordingly, the slides in both positions II and IV in FIG. 9a are in proper orientation for viewing. Thus, the slide in position IV closes the switch 217, so that the slide in position II is displayed. After a desired viewing interval, the tray 210 is rotated to allow viewing of another slide. Recesses 241 are formed in portions of the end walls 243 of the slide tray 210, so that the sensing element 221 is released as soon as the tray starts to rotate. Such release opens the switch and deenergizes the solenoid 231 so that the shutter 215 automatically moves into its aperture blocking position. When the next empty slide recieving pocket in the tray 210 is aligned with the exit end of passage 24, the slide in position III of FIG. 9a automatically falls, by the force of gravity, into position IV, as illustrated in FIG. 9b. The slide now in position IV has its lower or recessed end facing outwardly, and the switch 217 is not closed. Since the slides in both positions IV and II are incorrectly oriented for viewing, the projection aperture 126 remains blocked by the shutter 215.

In summary, provision of the apertures 239 in the slides, in combination with the movable shutter, greatly facilitates the use of single slides in a vertically oriented rotary slide tray.

Figure 11:
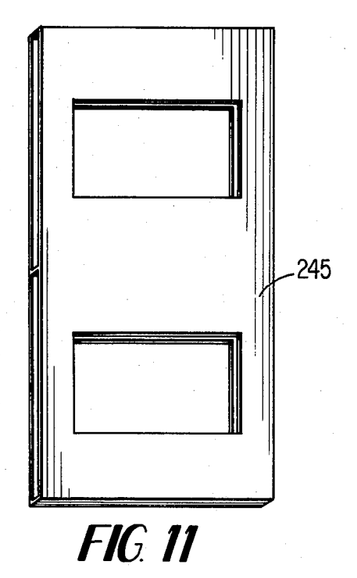
FIG. 11 is a perspective of a double slide holder usable with the present invention.
Figure 12:
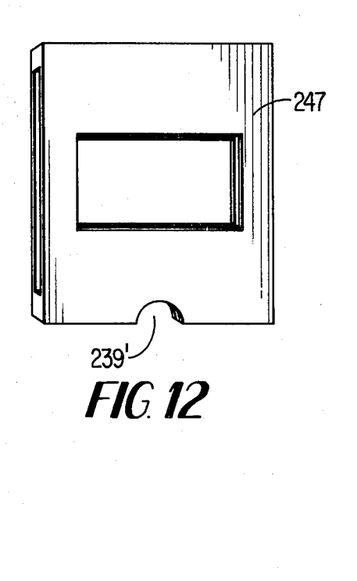
FIG. 12 is a perspective of a single slide holder usable with the present invention.

Referring now to FIGS. 11 and 12, slide holders 245 and 247 are illustrated. Both of the holders are designed to facilitate use of conventionally mounted slides with the present invention. Both holders have aligned apertures formed in their side walls to allow viewing of the photographic area mounted in a conventional slide. Use of the holder 245 makes it possible to obtain the advantages previously discussed in connection with the inventive double slide illustrated in FIG. 4. Similarly, provision of a recess 239' in the holder 247 makes it possible to obtain slides of the type illustrated in FIGS. 9a and 9b. Preferably, at least a portion of the holders 245 and 247 is made of magnetically attracted material.

Figures 13, 16:
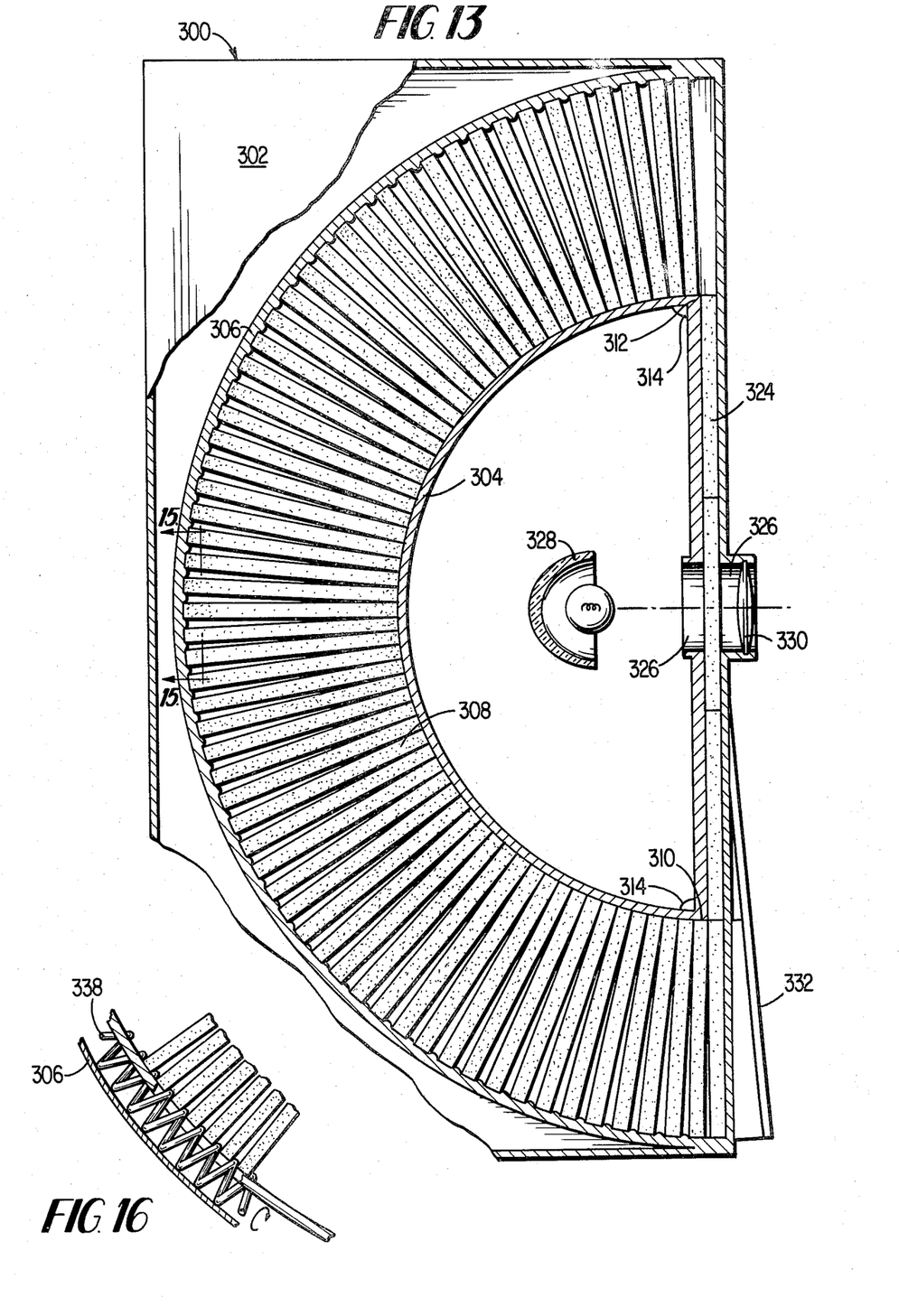
FIG. 13 is a side view, partially cut away, of aother embodiment of a slide projector according to the present invention.
FIG. 16 is a partial view of another modification of the slide projector of FIG. 13.
Figure 14:
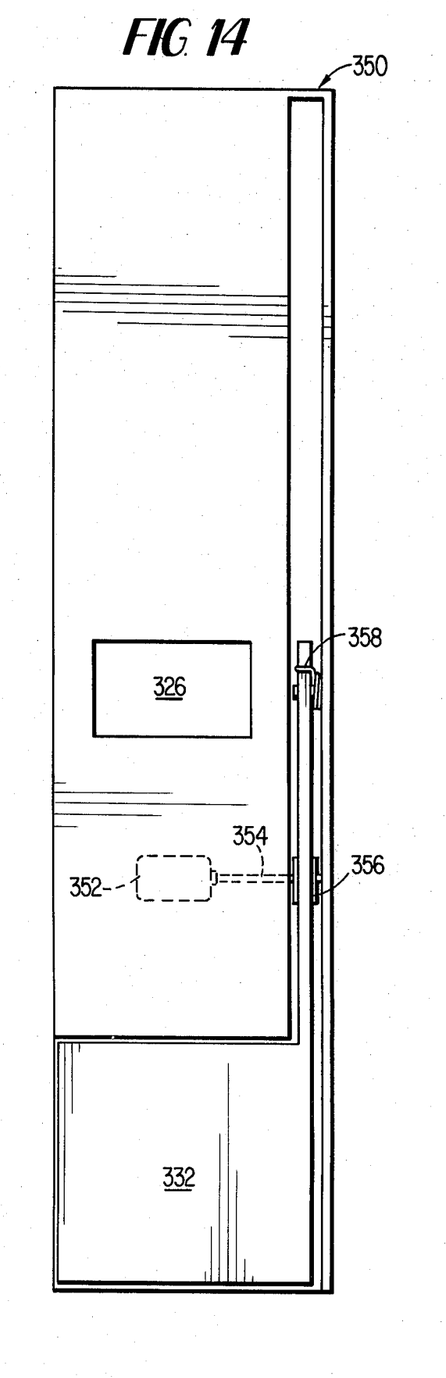
FIG. 14 is a schematic partial end view of a modification of the slide projector of FIG. 13.

Referring now to FIGS. 13 and 14, an embodiment of the invention is illustrated that is especially useful for educational and advertising purposes. With this embodiment, a projector is provided having a fixed slide tray that facilitates continuous viewing of slides. In one, relatively inexpensive embodiment, provision is made for manually advancing the slides, while in another embodiment, the advancement of slides is obtained automatically.

As illustrated in FIG. 13, a slide projector, generally designed 300, has side walls 302 defining a housing. Arcuate shaped walls 304 and 306 are positioned within the housing 302 to define a slide path, generally designated 308, having an inlet end 310 and an outlet end 312. Preferably, magnets 314 are positioned adjacent the inlet and outlet ends in order to retain slides, such as slides in holder 245 within the slide path 308. A slide passageway 324 is defined by walls of the housing and interconnects the inlet and outlet ends of the slide path. Aligned projection apertures 326 are formed in the walls defining the slide path 324. A suitable lamp housing 328 and projection optics 330 are aligned with the projection aperture 326. Since the slide path forms only one half of an annulus, it is possible to position a viewing surface perpendicular to the axis of the projection apertures 326. A pusher 332 is pivotally mounted to the housing 302 to advance slides from the lower end of the slide path 324 into the inlet end 310 of the slide path 308. Once a slide has been introduced into the inlet end, the magnet 314 retains the slide in the slide path. When single slides are used, the projector is modified to include a movable shutter similar to shutter 215. Such shutter can also be used when double slides are projected.

Figure 15:
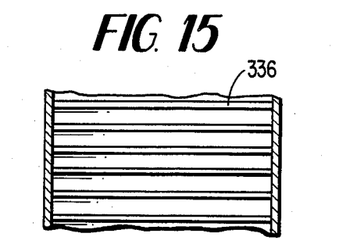
FIG. 15 is a partial view along line 15—15 of a modification of the slide projector of FIG. 13.

The outer wall 306 has a plurality of ridges 334 formed therein to maintain spacing between outer edges of slides inserted into the slide path. Inner edges of the slides are maintained in abutting relationship with each other so that insertion of a slide into a full slide path results in sequential advancement of all of the slides through the slide path, with the leading slide being forced out of the outlet end 312 into the slide path 324. Instead of ridges, the outer wall 306 can be formed with strips 336 of magnetic material, as illustrated in FIG. 15. Another alternative, as illustrated in FIG. 16, is to position a rotatable spring 338 inside the slide path 308 adjacent to the wall 306. The spring is formed in such manner that outer edges of slides are located between portions of the spring and are advanced through the slide path by rotation of the spring. When the spring is used, it is possible to eliminate the pusher 332.

The projector 300 also can incorporate a shutter, similar to shutter 215, for selectively blocking the projection aperture 324 and a control system similar to the system previously described in connection with FIGS. 7, 9a, 9b, and 10. When the projector 300 includes such a control system, the projector can be designed to use either single slides mounted in holders similar to holder 247, or double slides mounted in holders 245.

In a modification of the slide projector 300, as illustrated in FIG. 14, a slide projector 350 is provided with a motor 352 for controlling movement of the pusher 332. Only the modified portions have been illustrated because the other components of projector 350 are similar to the previously discused components of projector 350. An output shaft 354 of the motor is connected to an eccentric cam 356. A spring 358 urges the pusher 332 into contact with the cam 356 so that rotation of the cam controls movement of the pusher towards and away from the inlet end 310 of the slide path. In this manner, automatic or semi-automatic feeding of slides is provided.

Several different methods are usable to initially load the projector 300 with slides. For instance, one of the side walls 302 is removable to allow direct insertion and removal of slides into the projector 300. Alternatively or in addition, the slide passageway 324 extends upwardly and opens to an external surface of the projector 300 so that slides can be sequentially inserted into the passageway 324 and advanced into the slide path 308 by pusher 332. When slides are to be replaced, the projector is inverted so that slides already in passageway 324 fall out of the projector. The projector is then returned to its normal orientation, and the passageway 324 filled with new slides. Pusher 332 then is operated to advance the new slides into the slide path, which also fills the passageway 324. After all of the new slides have been advanced into path 308, the projector is again inverted to dump the old slides and the procedure is repeated.

It is understood, of course, that the foregoing descriptions are presented by way of example only and are not intended to limit the scope of the present invention. Various other embodiments are contemplated by the present invention. It is the intention that the present invention be limited only by the appended claims. For instance, with the slide projector 300 of FIG. 13, use is contemplated of an insert tray shaped as half of an annular member. Such insert trays could contain between approximately one hundred and one hundred and fifty pre-loaded slides, which, if the slides were double slides, would contain three hundred images. It will be appreciated that more or less slides could be contained, depending on the thickness of the slides and the arcuate length of the slide path defined by the insert tray. When such insert tray is used, the projector need only have a housing for holding the tray and for defining the slide passageway between the tray inlet and outlet, a projection system, and a pusher for advancing slides from the slide passageway into the tray. In use, the slide passageway would be loaded with blank slides and the insert tray would be positioned in the projector. The pusher would then be operated to advance the blank slides into the insert tray thereby advancing slides from the tray into the slide passageway, with the slides being selectively projected during their passage through the slide passageway.

What is claimed is:

1. A combined slide projector and rotary slide tray, said slide tray having slots for receiving slides opening inwardly, the slots having partially open outer edges, adjacent slots being at least partially separated from each other by separators having at least partially inwardly recessed outer edges;

said slide projector comprising a housing, central hub means positioned in said housing for rotatably supporting said slide tray, means for rotating said slide tray with respect to said central hub means, a substantially vertical slide passage defined in said hub means having an upper entrance end and a lower exit end alignable with said slots of said slide tray, a projection aperture formed in said slide passage, means including lamp means and projecting optics means for projecting a slide aligned with said projection aperture, shutter means for blocking said projection aperture, and control means for controlling movement of said shutter means comprising sensing means supported by said housing in alignment with said slide passage with switch means positioned to protrude into said slots and into the recessed portions of said outer edges, said switch means being closable by insertion of a properly oriented slide into a slot aligned with said slide passage exit, said control means further comprising means responsive to closing of said switch means for moving said shutter means from a projection aperture blocking position to an unblocking position;

the relationship between said slide tray and said slide projector being such that a slide is movable by gravity during rotation of said slide tray from a slot in said slide tray into said entrance end of said slide passage, is movable by gravity through said slide passage into a position resting on a slide previously introduced into said slide passage and in alignment with said projection aperture, and is movable by gravity out of the exit end of said slide passage into a slot in said slide tray.

2. A combined slide projector and rotary slide tray according to claim 1, wherein the slots in said rotary slide tray are dimensioned to hold a double slide comprising two individual single slides having like horizontal edges adjacent each other, a lower edge of said double slide upon insertion into a slot aligned with the exit end of said slide passage closing said switch means.

3. A combined slide projector and rotary slide tray according to claim 1, wherein the slots in said rotary slide tray are dimensioned to hold individual single slides, wherein the single slides are positioned in said slide tray in alternating fashion with the bottom horizontal edge of one slide facing inwardly and the bottom horizontal edge of the next adjacent slide facing outwardly, and wherein the same horizontal edge of each slide is formed with a recess, the slides being fed through said slide passage in such manner that every other slide has its recessed horizontal edge entering the slot aligned with the exit end first so that said switch means is not closed whereby every other slide passes said projection aperture without being projected.

* * * * *